United States Patent [19]

Perry et al.

[11] Patent Number: 5,672,039

[45] Date of Patent: Sep. 30, 1997

[54] ORDER CONSOLIDATION INDEXING SYSTEM

[75] Inventors: Daniel C. Perry, San Jose; Louis Hiti, Fremont; Robert M. Surtees, Hayward, all of Calif.

[73] Assignee: Computer Aided Systems, Inc., Hayward, Calif.

[21] Appl. No.: 205,989

[22] Filed: Mar. 4, 1994

[51] Int. Cl.⁶ ................................................. B65G 25/10
[52] U.S. Cl. ........................................ 414/280; 414/286
[58] Field of Search ................................. 414/276, 280, 414/286; 211/162; 193/35 C

[56] References Cited

U.S. PATENT DOCUMENTS

| | | | |
|---|---|---|---|
| 2,556,110 | 6/1951 | Nanninga | 198/223 |
| 2,815,871 | 12/1957 | Ferguson | 414/285 |
| 3,837,511 | 9/1974 | Howlett | 414/286 X |
| 4,081,088 | 3/1978 | Rysti | 414/268 |
| 4,197,047 | 4/1980 | Haldimann | 414/276 |
| 4,200,421 | 4/1980 | Haldimann | 414/280 |
| 4,467,725 | 8/1984 | Haldimann | 414/280 X |
| 4,595,330 | 6/1986 | O'Brien et al. | 414/276 |
| 4,752,175 | 6/1988 | Lichti | 414/276 |
| 4,874,281 | 10/1989 | Bergerioux et al. | 414/285 |
| 5,059,080 | 10/1991 | Naumanen | 414/276 |
| 5,222,855 | 6/1993 | Bernard, II et al. | 414/331 |
| 5,228,819 | 7/1993 | Hammond | 414/286 X |
| 5,238,351 | 8/1993 | Lichti, Sr. et al. | 414/331 |
| 5,246,332 | 9/1993 | Bernard, II et al. | 414/786 |
| 5,350,270 | 9/1994 | Stallard et al. | 414/276 |

FOREIGN PATENT DOCUMENTS

| | | |
|---|---|---|
| 0288590 | 11/1988 | European Pat. Off. . |
| 2002662 | 10/1969 | France . |
| 2240875 | 3/1975 | France . |
| 2310292 | 12/1976 | France . |
| 2594099 | 8/1987 | France . |
| 0131278 | 12/1979 | Japan . |
| 0239022 | 9/1990 | Japan ................................ 198/358 |
| 8907563 | 8/1989 | WIPO . |

OTHER PUBLICATIONS

Japanese Patent Abstracts, vol. 13, No. 204, of Japanese Patent No. 1-28102.

*Primary Examiner*—James W. Keenan
*Attorney, Agent, or Firm*—Fish & Richardson P.C.

[57] ABSTRACT

An apparatus and method for consolidation of warehoused goods into orders, sets or kits is described. The apparatus allows precise positioning of a large number of objects supported by a movable rigid member, without requiring precise drive motion. The method allows concurrent transfer of a large number of articles, to fill the same or different ones of a large number of orders, where items for different orders may be initially stored in the same or different storage containers.

7 Claims, 14 Drawing Sheets

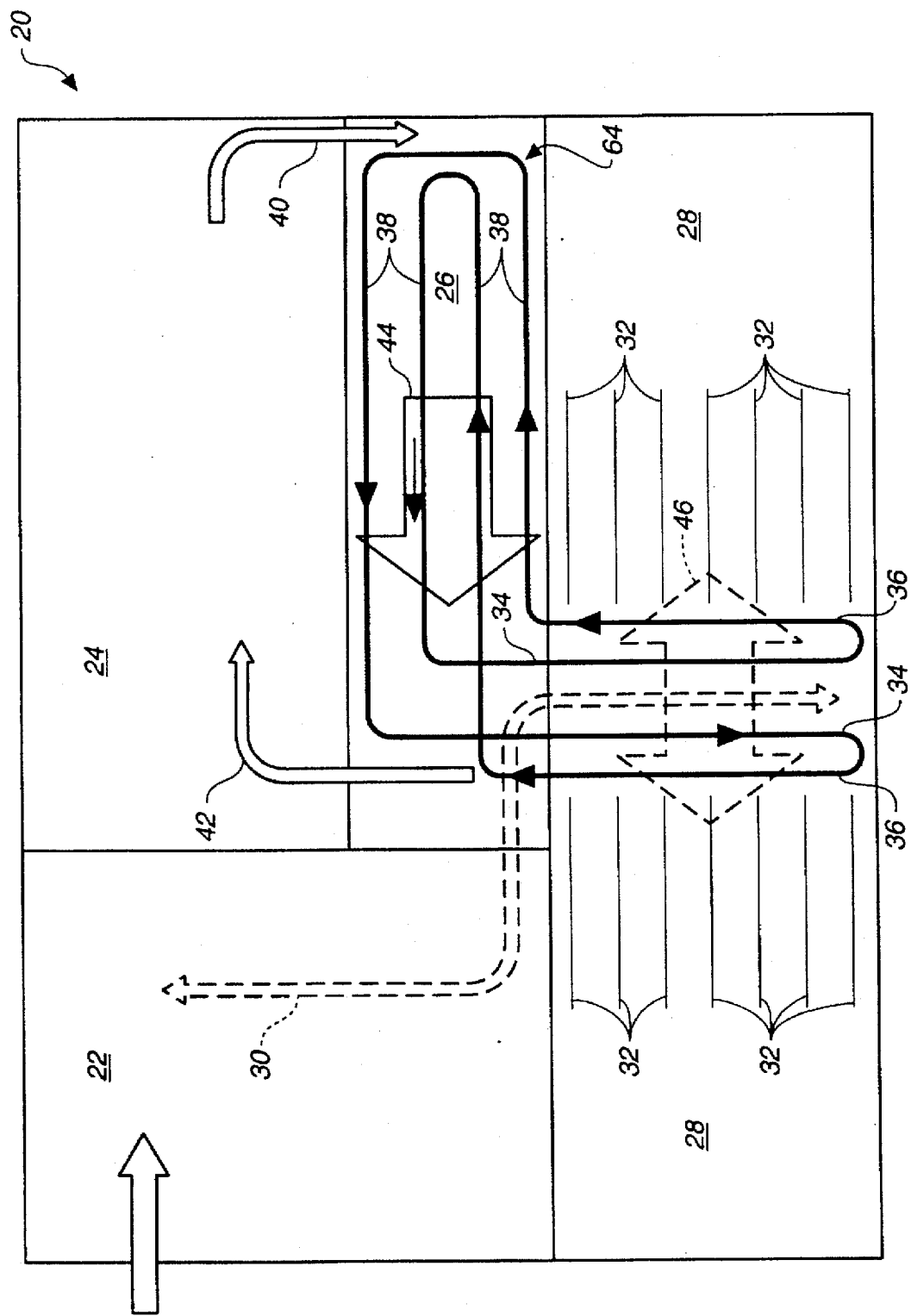
FIG._1

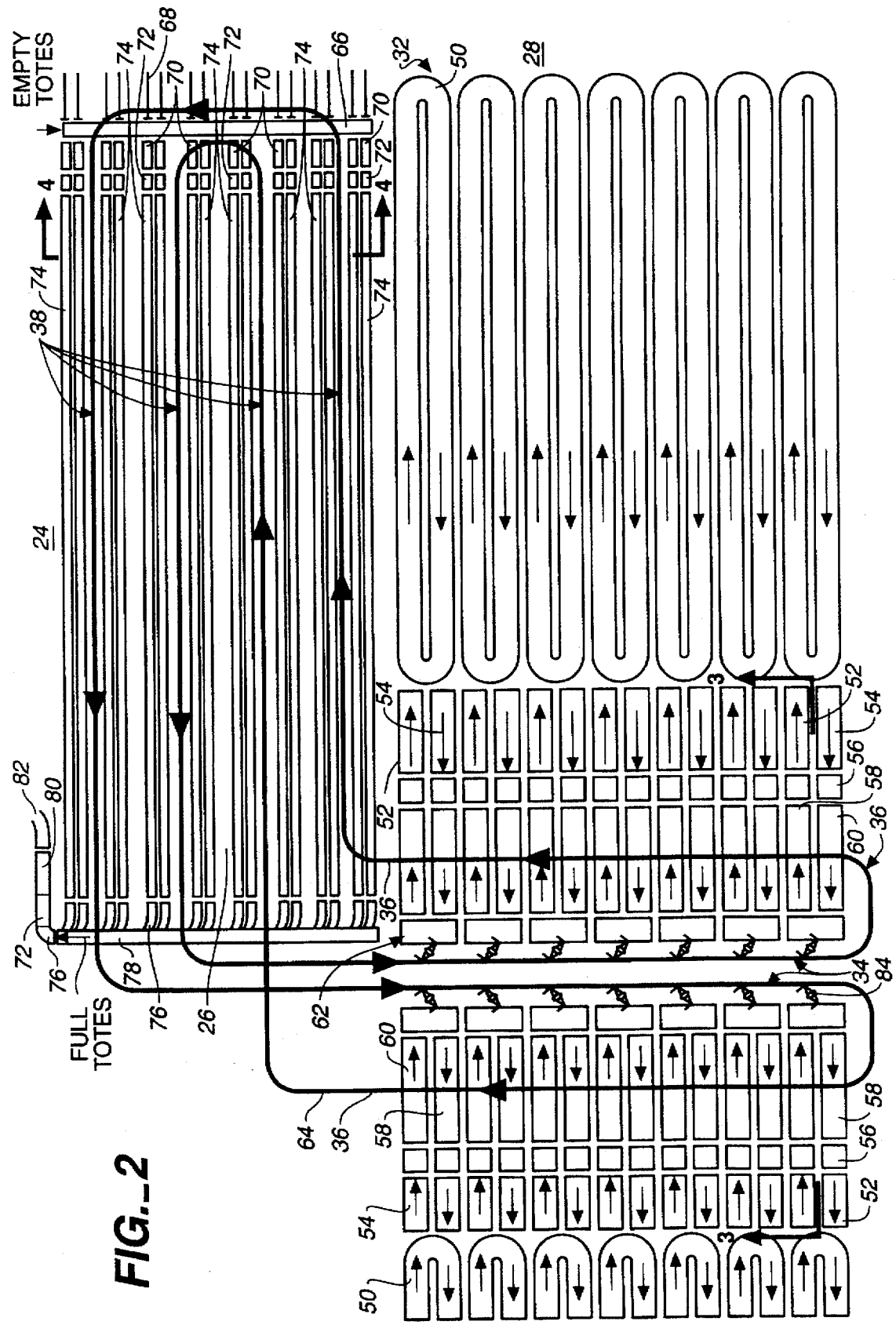
FIG._2

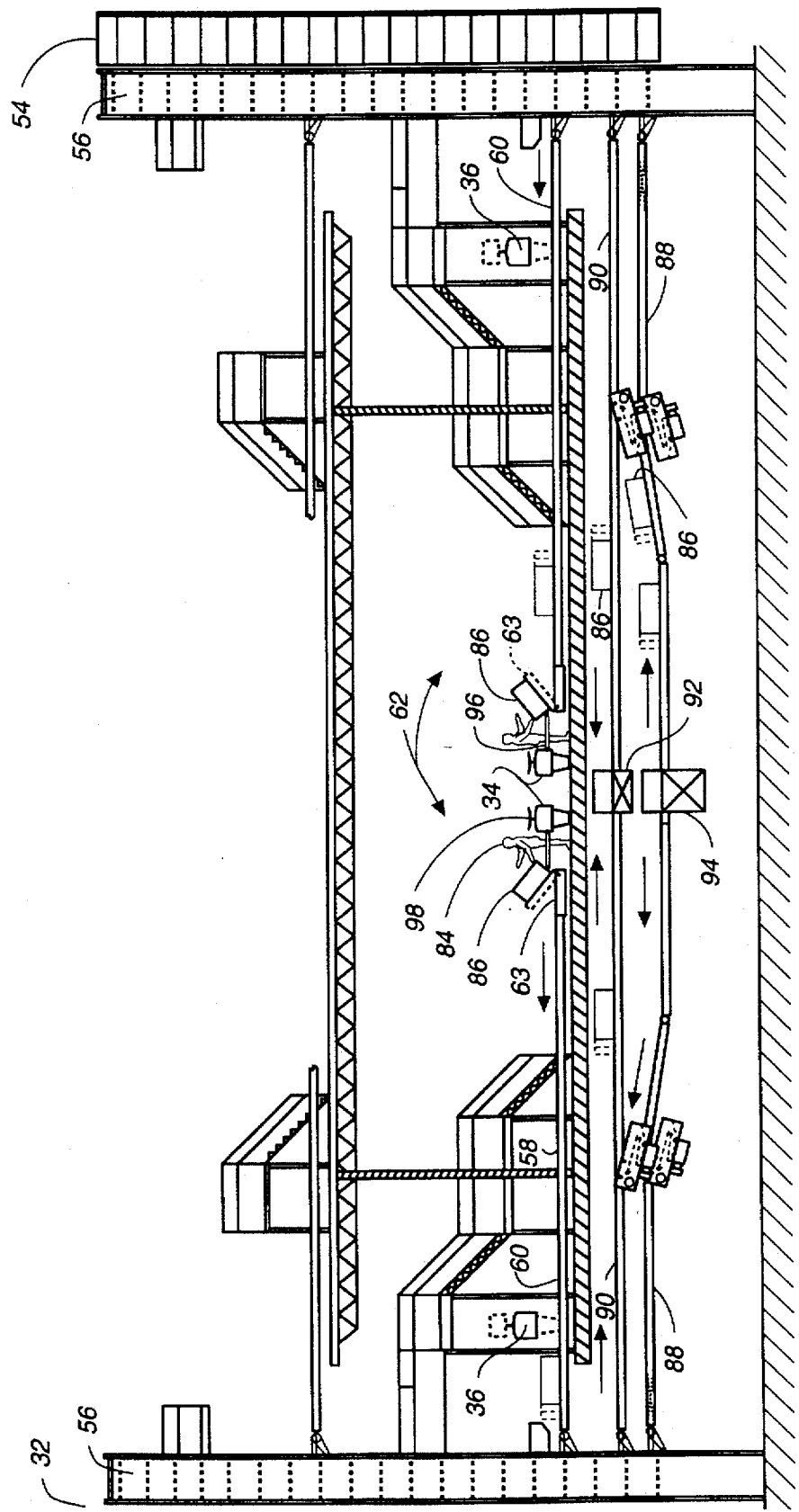
FIG._3

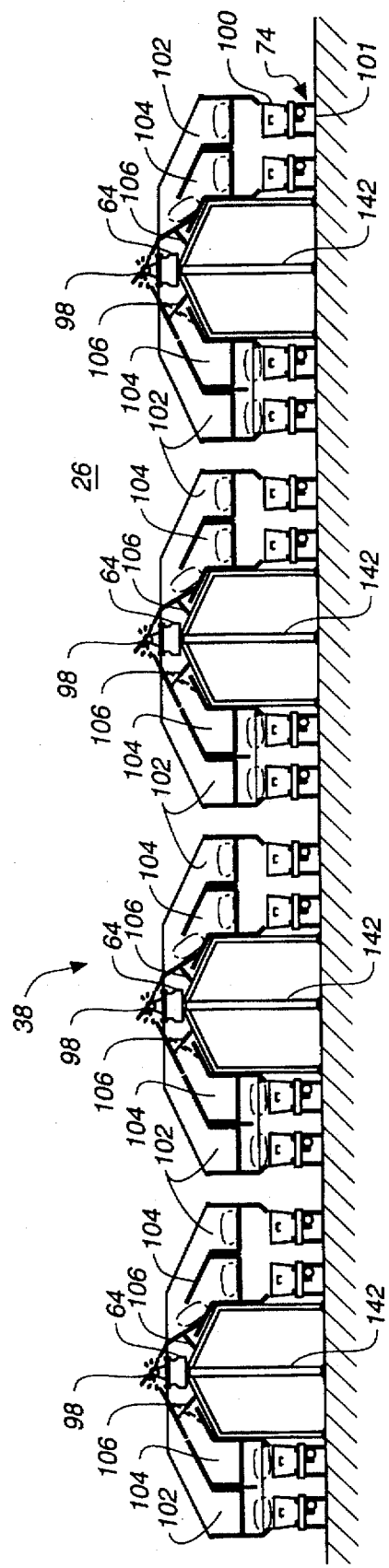

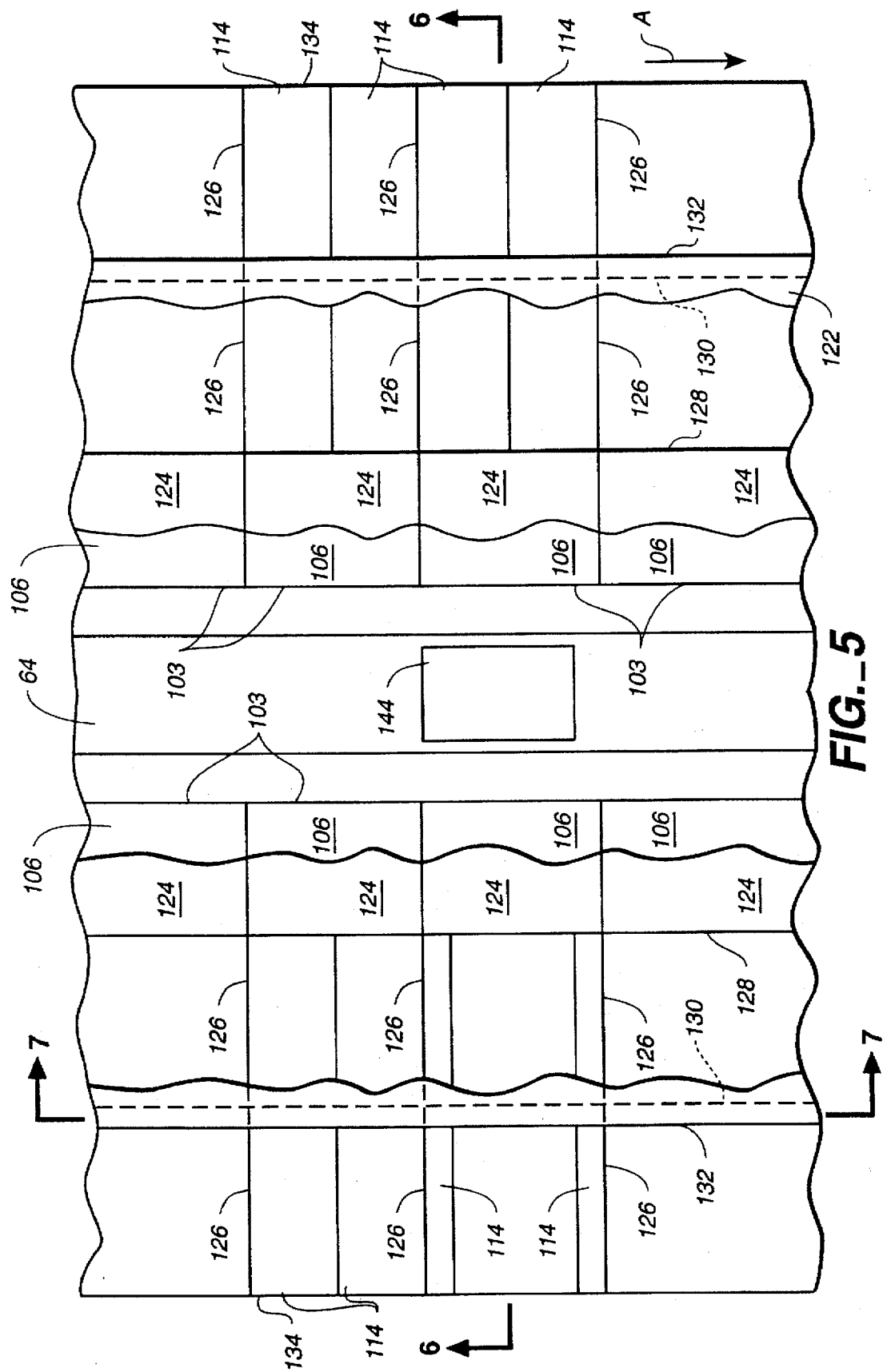
FIG._5

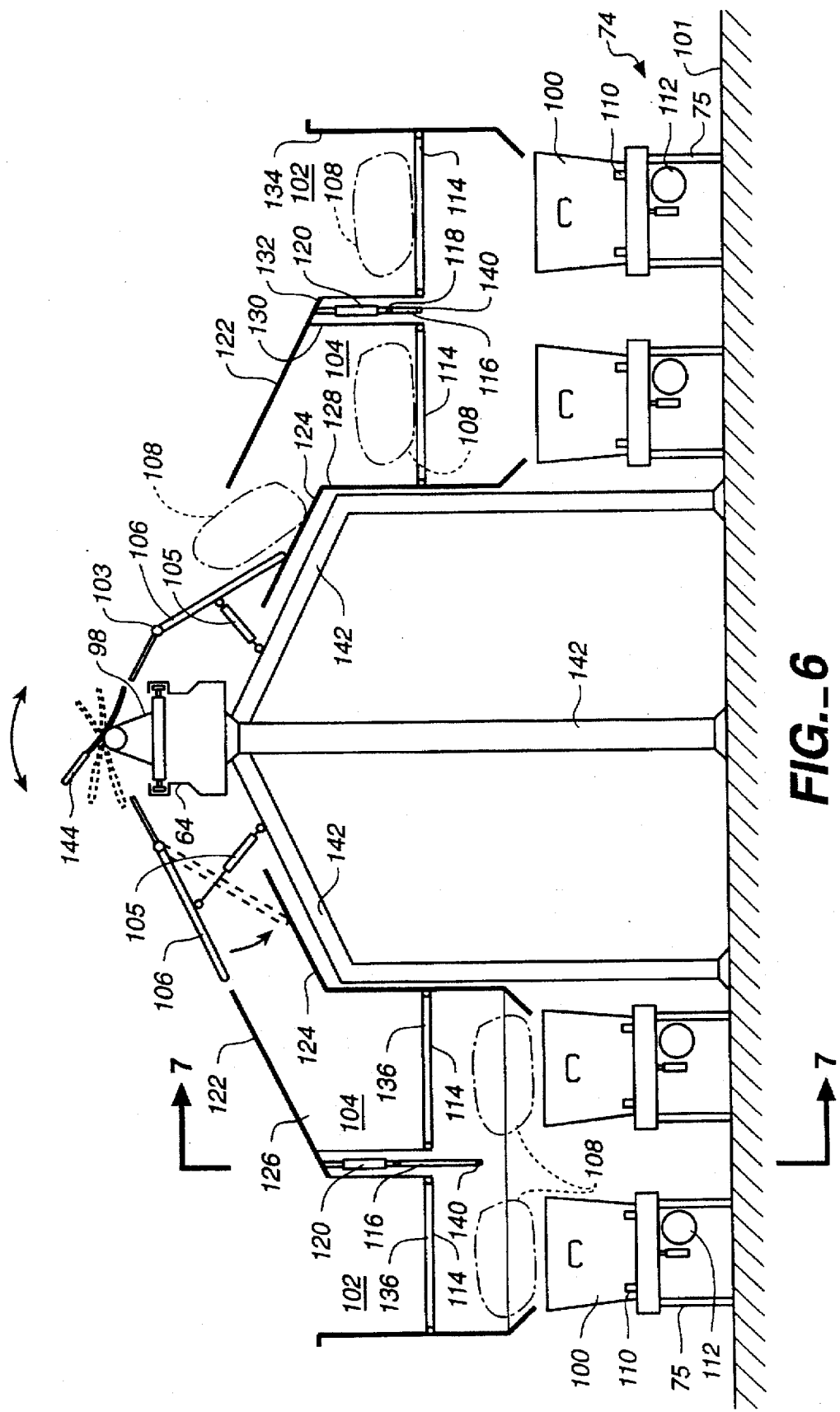

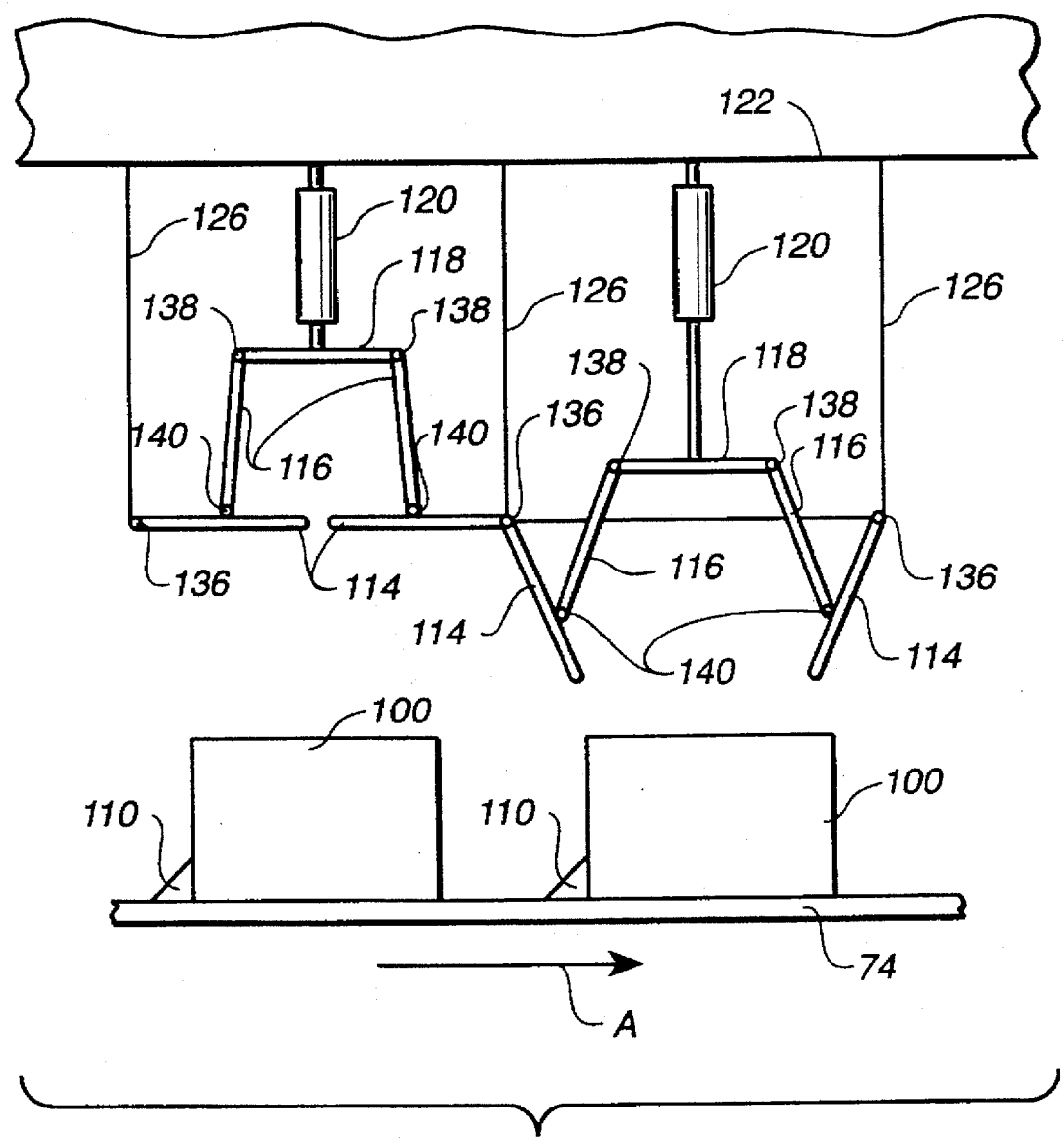
FIG._7

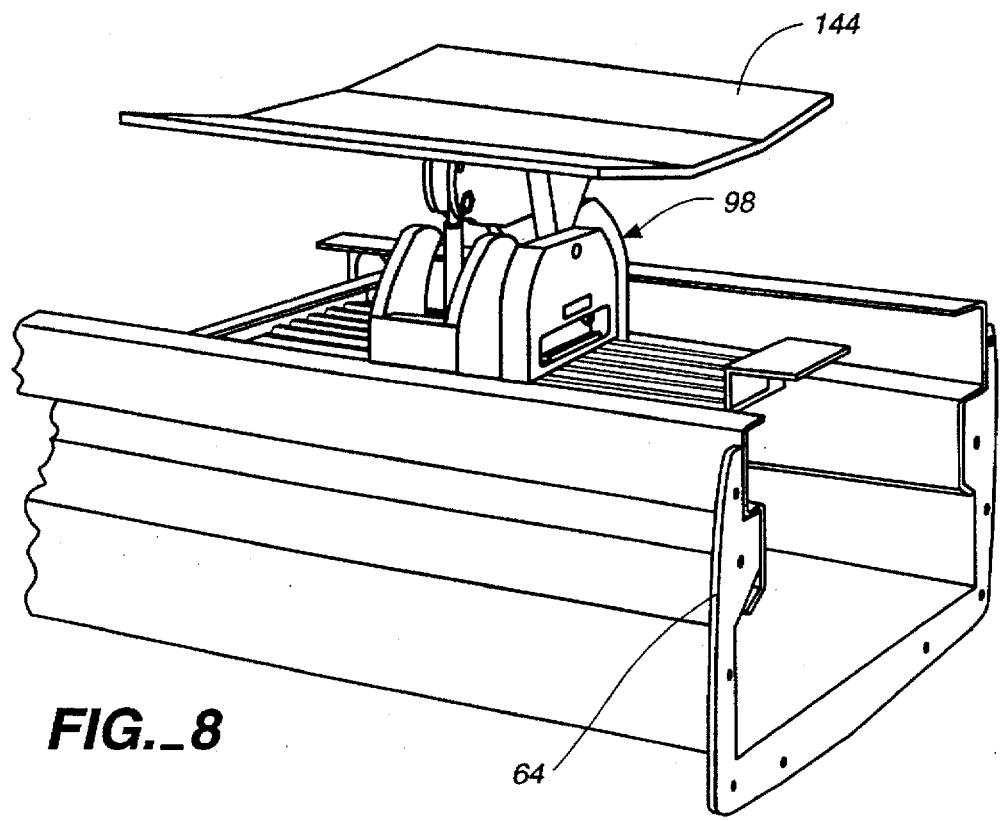
FIG._8
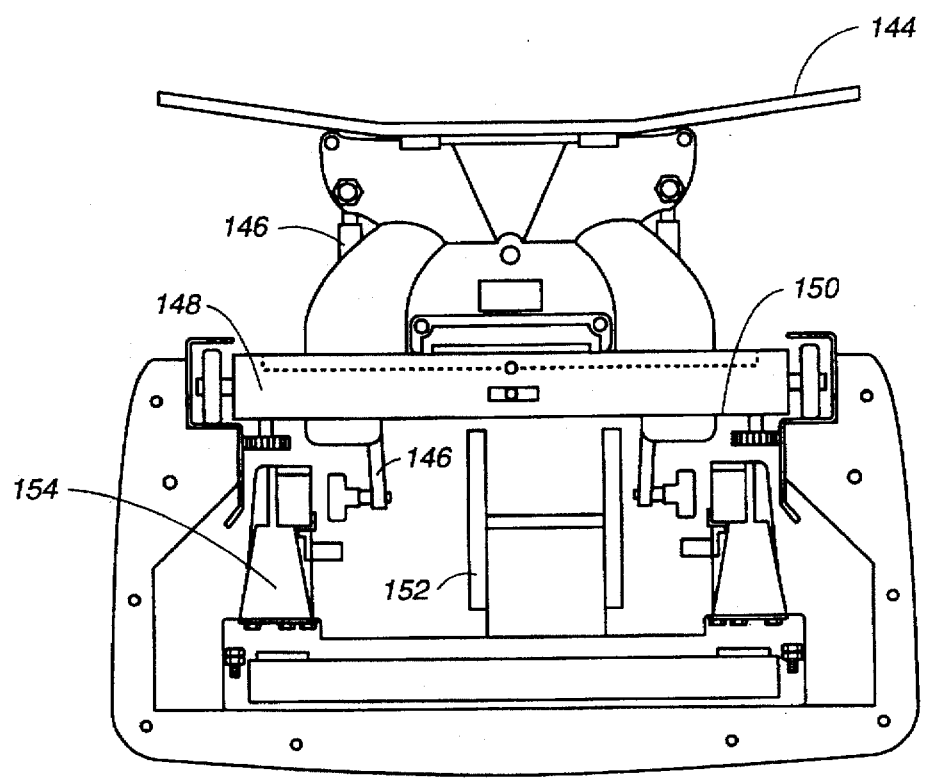
FIG._9

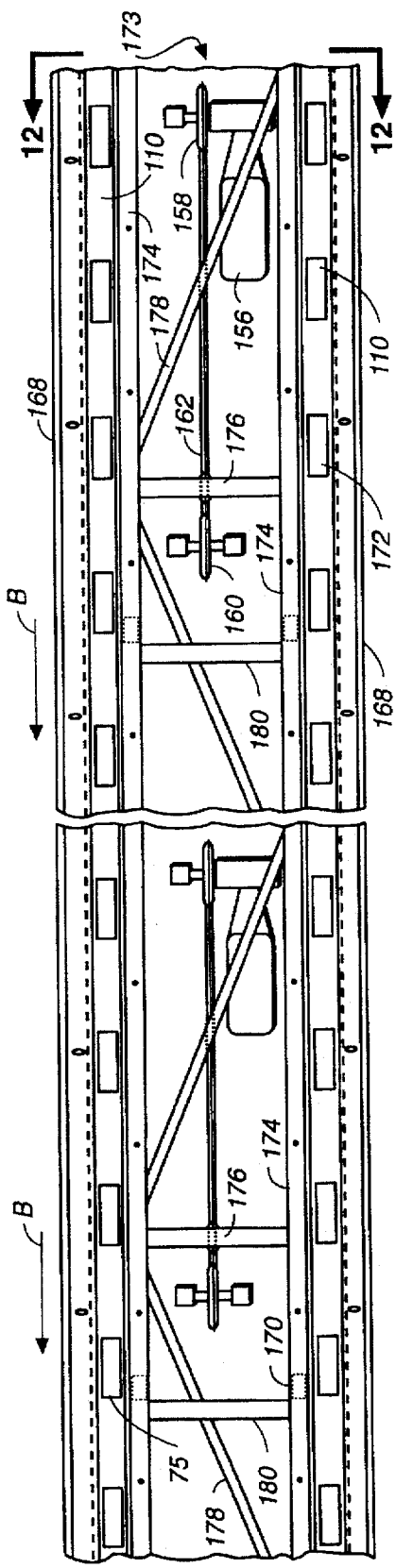
FIG._11
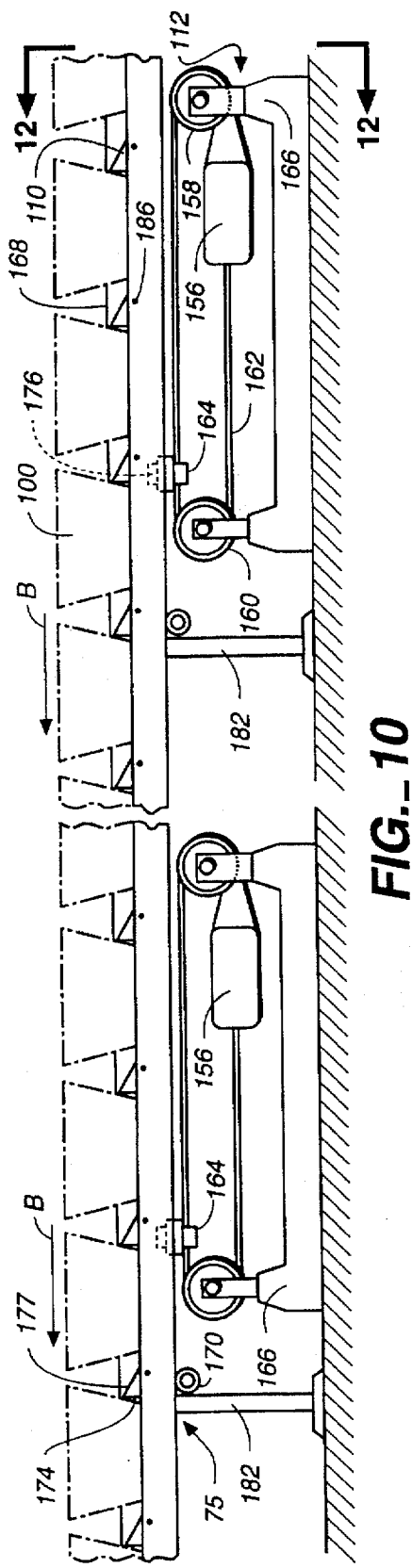
FIG._10

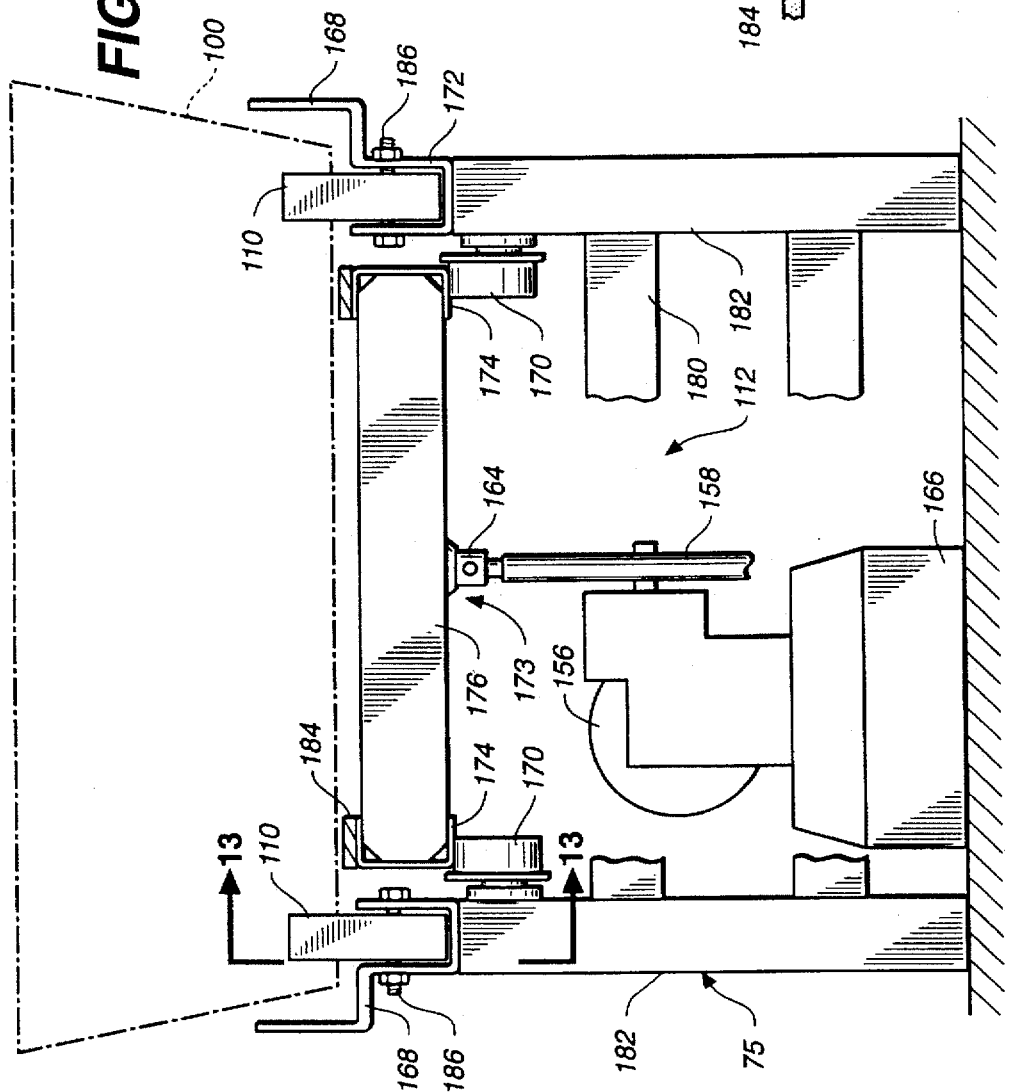
FIG._12
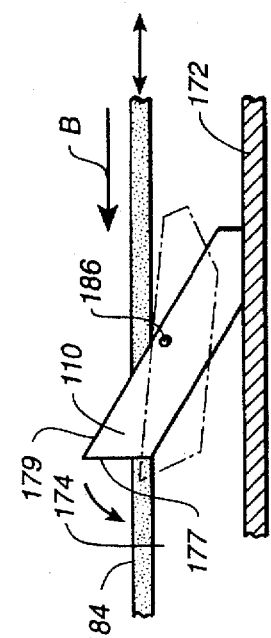
FIG._13

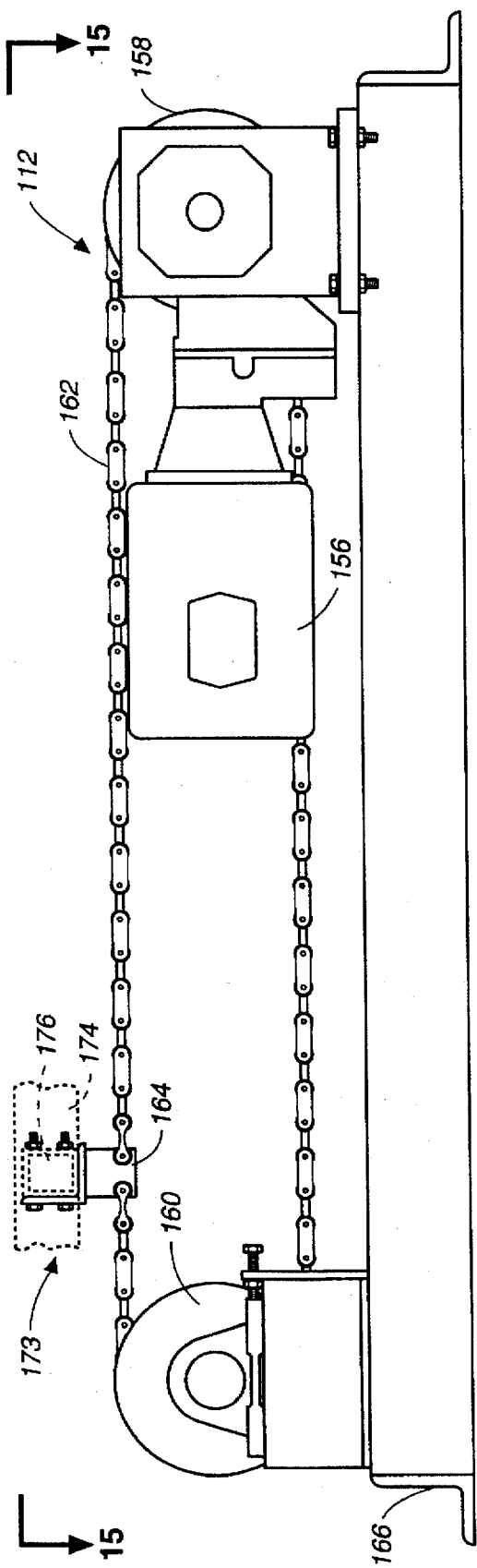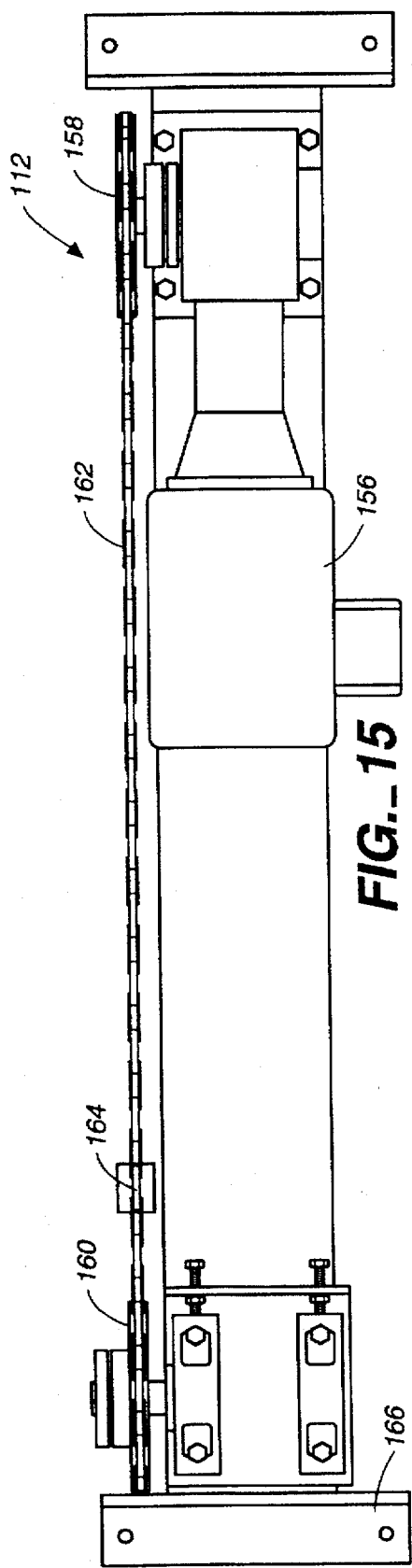
FIG._14
FIG._15

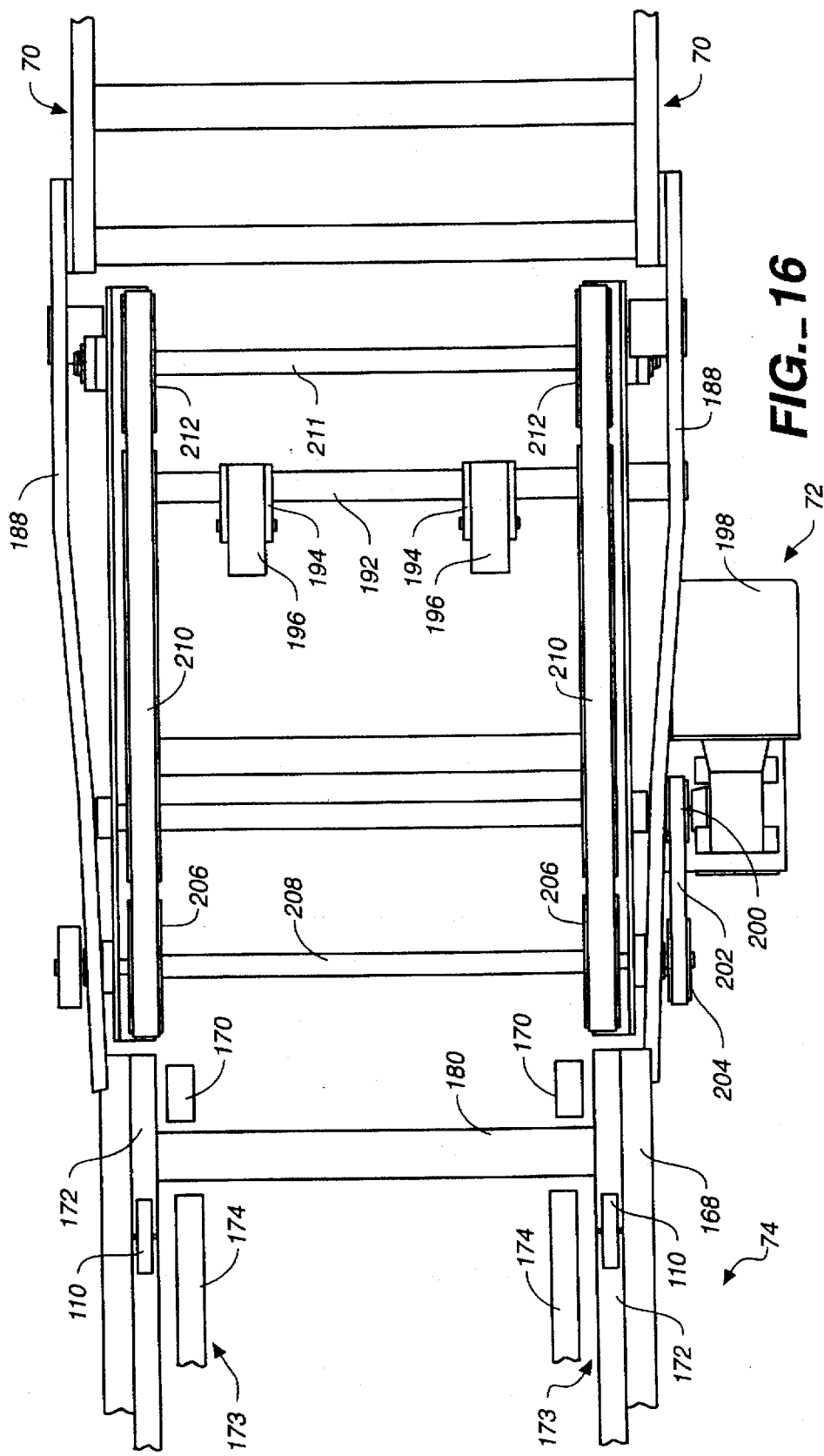
FIG._16

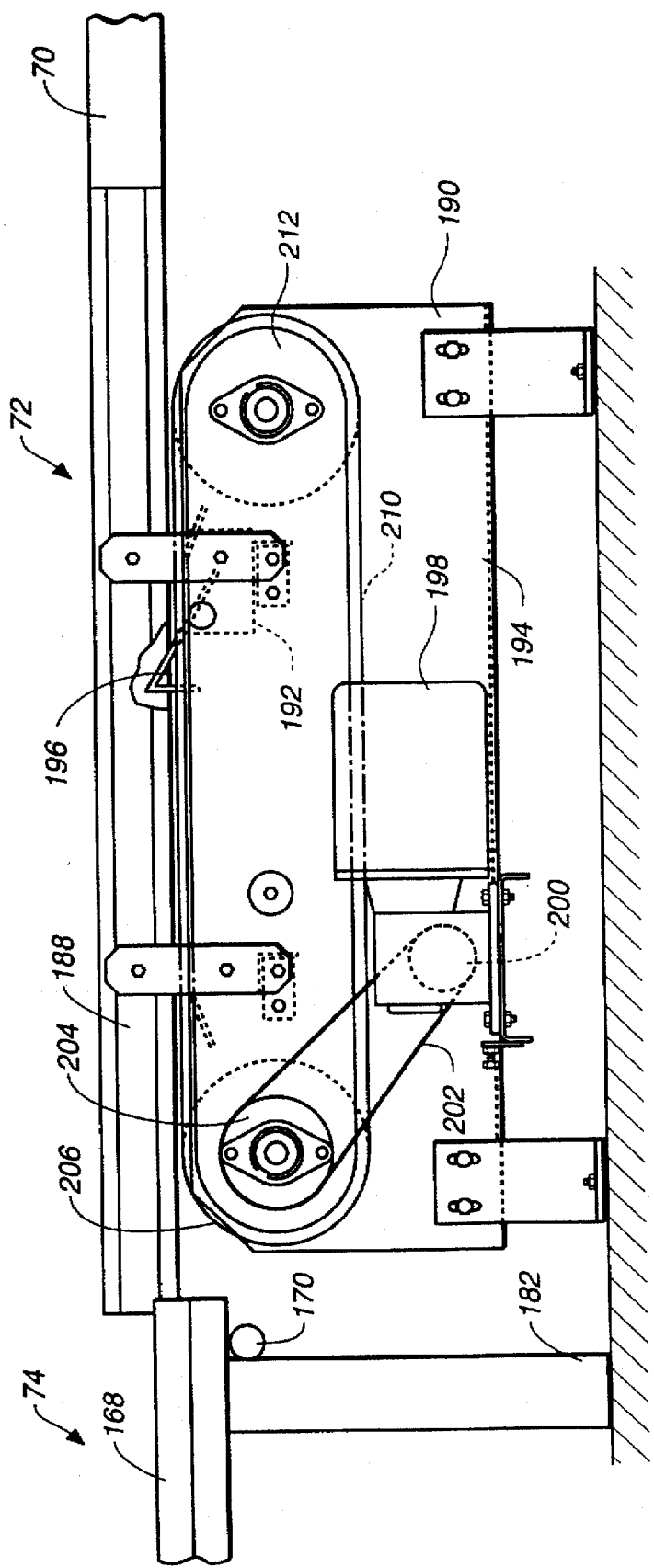
FIG._17

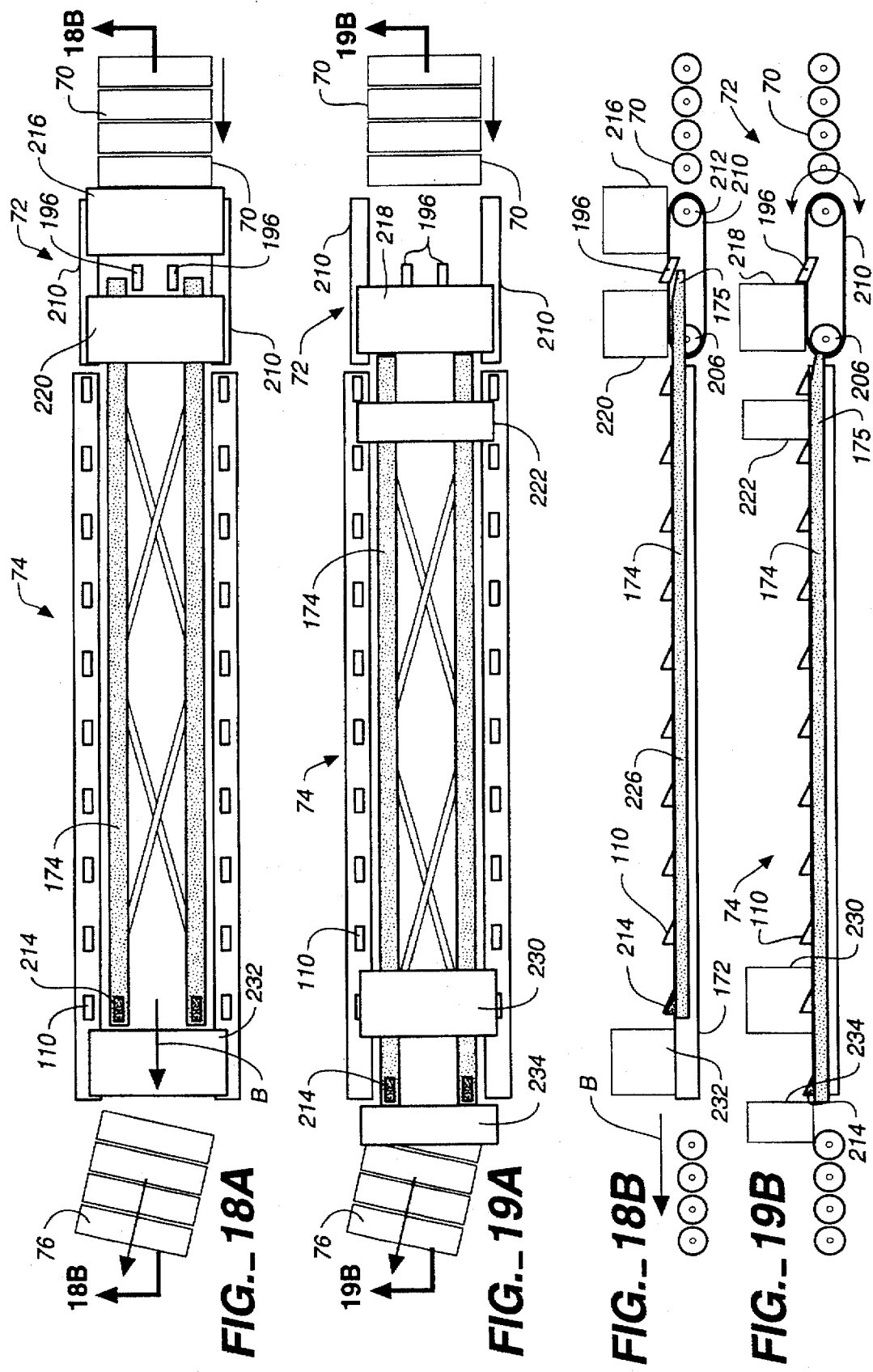

ORDER CONSOLIDATION INDEXING SYSTEM

BACKGROUND OF THE INVENTION

The present invention relates generally to an automated warehousing system for storing and retrieving goods, and more particularly to an automated system for consolidating sets, orders, or kits of goods within an automated warehousing system.

Many modern distribution systems require the storage and retrieval of thousands of inventoried goods or items. Often goods must be stored in bins or containers due to their size or delicate construction. Therefore, storage requires loading and delivering the containers to a known location or storage position where they can later be retrieved as necessary. When an order is received, the desired items must be retrieved from their respective storage positions and prepared for either shipping or use. An effective warehousing operation requires the ability to both rapidly retrieve a wide variety of goods from storage and to efficiently dispose of the retrieved goods. The goods are usually received and disposed of in groups which do not coincide. Thus the handling of goods usually requires their regrouping. The present invention relates generally to an automated system for rapidly and effectively regrouping or consolidating goods.

An example of an existing complex distribution and storage application is the environment of an electronic product manufacturing or repair facility wherein the products built incorporate printed circuit boards. Such warehousing applications may require storage of as many as 150,000 components, the vast majority of which would fit into 6"×6"×18" compartments. In any given day as many as five to ten thousand assorted components may be drawn from the storage facility. In the environment of a repair facility, there must also be an effective mechanism for storing various items. The stored items may include working parts associated with a malfunctioning part in the process of being repaired and/or components that cannot be repaired using parts in stock while the unavailable parts are on order. Absent effective integration between the storage system and the workstations of the repair or manufacturing facilities, the combined man hours lost between delivering the goods to the appropriate workstation and the down time at various workstations as they wait for supplies to be delivered would make the facility cost prohibitive.

Another typical example of a complex distribution operation is a consumer products and pharmaceutical warehousing facility which stores and arranges such products for delivery to retail outlets. Modern consumer products warehousing facilities may require the storage of on the order of 25,000 stock items which must be stored in both case lots and piece lots. The individual stock items may range in size anywhere between 1"×1"×1" to 36"×36"×18". A representative warehouse may have on the order of 1000 customers with, perhaps, 400 to 800 customers placing orders on any given day. The orders may call for as many as 60,000 individual stock units and the actual number of items requested for each particular stock unit may vary widely. Additionally, it is desirable to package the ordered goods for each customer in lots of related goods rather than sending each customer a truckload randomly containing all of the goods that particular customer requested. For example, in the consumer products and pharmaceutical application described, related families of products might include medications, hair care products, cosmetics, etc. Consolidating the orders in groups of related goods facilitates rapid restocking at the retail store when the goods are ultimately delivered. Often, the ordered goods are delivered in totes designed specifically for the purpose of transportation between the warehouse and the retail stores.

Yet another application wherein efficiently regrouping of goods is required is in the environment of a production-line facility wherein parts to be assembled are kitted. Recent studies investigating productivity and quality control have suggested that it is often more efficient to allow an individual worker to assemble whole products (or at least substantial components), rather than using an extended production line wherein each employee adds only one or two small parts to a larger system. A drawback to such systems is that in order to effectively allow a single assembler to put together a product having a large number of parts, it is important to "kit" the parts. That is, they need to be arranged in readily accessible groups, preferably in the order of construction. In many production lines, the kitting stage proves to be the slowest link. Therefore, there is a need for a means for effectively kitting parts for production requirements.

To facilitate these and other distribution applications, various integrated warehousing systems have heretofore been proposed. For example, Japanese Pat. Application No. 53-37829 discloses a method for sorting goods that are stored on fixed storage shelves. The system contemplates moving boxes containing ordered goods from a storage shelf onto a horizontal loop-type conveyor which transfers the boxes to a branch line wherein they are reviewed by an operator. The operator looks at the goods in the box and then identifies the customers who need such goods. He then drives a second loop-type conveyor to bring a container before him into which the ordered goods may be placed. However, such a system has significant time delays in delivering goods to the operator. Further, the system is not fully automated and the equipment provided is not organized to maximize efficiency.

U.S. Pat. No. 5,222,855, issued Jun. 29, 1993 and assigned to the assignee of the present application, discloses a warehousing system comprising an automated work center which, in one embodiment, serves as a shipping workstation where goods, initially stored in containers, are consolidated into consolidation containers for shipment to customers. Each consolidation container is filled at one such workstation and the goods in containers are transferred from a storage structure to the workstation over a conveyor network. The workstation may include a vertical queue capable of storing more than one such container. In this arrangement, the goods in each container are made unavailable for filling other orders while the container travels over the conveyor network or while it is stored in the vertical queue.

It is a primary object of the present invention to provide a new and improved consolidation system and method for use in conjunction with warehousing, production or repair facilities for handling the consolidation of items in great quantity and variety wherein required manual operations are minimized.

Another object of the present invention is to provide a system for simultaneously and accurately positioning a large number of objects, such as consolidation containers, at an array of positions, such as under an array of hoppers, without, among other things, requiring precise drive motion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to a method for consolidating goods or items and to an apparatus for efficiently carrying out such a method.

The goods to be consolidated are usually held in a storage structure in storage containers that can be handled automatically. Since a computerized control system keeps track of the location of the goods in the storage system, there are no restrictions on the way the goods are distributed among the storage containers, and in the absence of information on how they will have to be grouped for delivery, it is most convenient to group them based on the order in which they are received.

When an order is received, the items or goods that make up the order must be consolidated. The fastest consolidation is achieved if the goods are moved concurrently to a fixed common location and held at a holding station or in a holder such as a hopper.

For maximum throughput, however, not only must the items in one order be moved concurrently, but a plurality of orders should be consolidated concurrently at a common location. To this end, it is desirable to have the capability to move more than one item from a particular storage container to more than one destination at one time. This may not be possible if the entire storage container were moved. The storage containers may be out of the storage structure only long enough to remove some of their contents for concurrent transfer to the common location or locations where they are consolidated. After the desired goods or articles are removed from the storage container, the containers may be returned to the storage structure and made available for removal of any remaining goods that they contain. The removed articles can then be transported to the holder. This can be accomplished automatically using a sorter as explained in the detailed description below.

The goods at the holder station may be transferred into a consolidation container. The holder station can then be filled with a new order, while the filled consolidation container is replaced with an empty consolidation container and moved to make the consolidated order available, for example, to a packing station. The consolidation containers are preferably moved automatically. The mechanism for moving the consolidation containers is simplified if all consolidation containers are moved at the same time.

The present invention provides a method, satisfying all of the above requirements, of regrouping into final groups goods initially grouped in initial groups in storage containers. A holder such as a hopper is assigned to each final group. A storage container for each good belonging to a final group, is extracted from a storage structure. The ordered goods are moved onto a sorter, after which the storage container may be returned to the storage structure where it can again be accessed. The sorter then moves the goods to an assigned holder. The holder or holders are filled by executing this sequence of steps repeatedly and concurrently. While a holder is being filled, a full consolidation container or containers previously positioned near a holder may be replaced with an empty consolidation container such that there is a one-to-one relation between the holders and the empty consolidation containers. After the consolidation containers are positioned near an associated holder, either before or after the holder is full, the holder's contents are transferred to the associated consolidation containers.

This method can be automated by using hoppers as holders, positioning an associated consolidation container underneath the hoppers and dropping the goods from the hoppers into the consolidation containers. This requires precise positioning of consolidation containers underneath a large number of hoppers. The consolidation containers may be supplied by a consolidation container supply conveyor and then removed by a consolidation container takeaway conveyor.

The present invention provides a simple and effective apparatus for precisely positioning objects at a linear array of positions or at a plurality of such linear arrays that are laterally spaced. For such a long array, a belt or chain conveyor cannot provide the precise positioning required because of stretching of the belt or chain, which can be as much as several feet for a chain several hundred feet long.

In the apparatus of the present invention, the objects are supported by a rigid reciprocating member capable of propelling the objects while the member is moving in a forward direction and of exerting a force on the objects while the member is moving in a backward direction. The movement of the member may be less precise than the required precision in positioning the objects under a respective holder. The reciprocating member is movably supported by a frame. A guide attached to the frame confines the objects to movement in the forward and backward directions. Attached to the frame are a plurality of stops positioned at desired positions. The stops allow forward movement of the objects and prevent backward movement of the objects when the objects abut the stops. A drive is provided for moving the reciprocating member alternately forward and backward. As a result, the objects advance from one position to the next on the forward movement, and abut against the stops and are positioned on the backward movement of the reciprocating member.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 1 is a schematic plan view of a warehouse wherein the present invention may be used.

FIG. 2 is an enlarged plan view of the storage and consolidation areas of FIG. 1.

FIG. 3 is a cross-sectional view of the storage area taken along line 3—3 of FIG. 2.

FIG. 4 is a cross-sectional view of the consolidation area taken along line 4—4 of FIG. 2 to schematically illustrate the arrangement of a sorter, hoppers, and an order consolidation indexing system (OCIS) in the consolidation area.

FIG. 5 is a schematic partial plan view of a section of the sorter, hoppers, and OCIS with a chute of the hopper partially broken away.

FIG. 6 is an enlarged cross-sectional schematic view of a sorter track, associated hoppers, and the OCIS along line 6—6 of FIG. 5.

FIG. 7 is a cross-sectional schematic view of the hoppers taken along line 7—7 of FIG. 6.

FIG. 8 is a perspective view of a sorter tilt tray and a section of its track.

FIG. 9 is an elevational view of the sorter tilt tray and track section of FIG. 8.

FIG. 10 is a schematic elevational view of an OCIS.

FIG. 11 is a schematic plan view of the OCIS.

FIG. 12 is a cross-sectional view of the OCIS taken along line 12—12 of FIGS. 10 and 11.

FIG. 13 is a schematic elevational view of a stopper and reciprocating frame of the OCIS wherein certain components have been omitted for clarity.

FIG. 14 is a schematic elevational view of the drive mechanism of the OCIS.

FIG. 15 is a schematic plan view of the drive mechanism of the OCIS.

FIG. 16 is a schematic plan view of the feed device of the OCIS.

FIG. 17 is a schematic elevational view of the feed device of the OCIS.

FIG. 18A is a schematic plan view of the OCIS with the reciprocating frame in its rear position.

FIG. 18B is a schematic cross-sectional view of the OCIS taken along line 18B—18B of FIG. 18A.

FIG. 19A is a schematic plan view of the OCIS with the reciprocating frame in its forward position.

FIG. 19B is a schematic cross-sectional view of the OCIS taken along line 19B—19B of FIG. 19A.

DESCRIPTION OF THE PREFERRED EMBODIMENT

Turning now to the drawings, wherein like components are designated by like reference numerals throughout the various figures, FIG. 1 shows a warehousing system 20. The warehousing system may comprise a receiving area 22, a shipping area 24, a consolidation area 26, and storage area 28. The goods received in receiving area 22 may be stored in storage containers 86 (see FIG. 3) based on the way in which they are received. Examples of goods are clothes, electronic parts, consumer articles, medications, etc. The storage containers are then moved to storage area 28 using, for example, a conveyor network indicated generally by arrows 30 and 46, described in greater detail below, and kept in storage structures 32. Containers 86 may be divided into compartments using removable wall inserts, and their dimensions may be 36"×36"×20". When an order is received, the goods ordered may be transferred from storage containers onto a sorter line and propelled therealong from storage area 28 to holders or a holding station in consolidation area 26. The sorter, as discussed in more detail below, may comprise a continuous sorter track 64 guiding tilt tray assemblies 98 including tiltable trays 144, and the holders may include a number of hoppers 102 and 104 (see FIGS. 4-9).

By way of example, the sorter track may comprise eight interconnected straight sections. The trays may be loaded with the appropriate goods as they move along sections 34, enter the consolidation area via sections 36 and discharge their contents into the hoppers while moving along sections 38. The transfer from the hoppers to consolidation containers 100 (see FIG. 4) may be gravity motivated, the goods being dropped from each hopper into a consolidation container. Empty consolidation containers are brought from shipping area 24 (FIG. 1), along a conveyor as indicated by arrow 40. The consolidation containers may then be moved along the length of consolidation area 26 as indicated by arrow 44 to position them under their respective hoppers. After the goods are transferred from the hoppers into the consolidation containers, the containers are moved to a take-away conveyor that transfers the consolidation containers to shipping as indicated by arrow 42. When one of the storage containers kept in storage structures 32 becomes empty, it is taken back to receiving 22 by conveyor network 30 and 46 where it can be filled again.

As shown in greater detail in FIGS. 2 and 3, storage structures 32 preferably include continuously moving storage carousels 50 (FIG. 2) that can be automatically loaded and unloaded on the fly. Such a carousel is disclosed in U.S. Pat. No. 5,238,351, issued Aug. 24, 1993 and assigned to the assignee of the subject application, the disclosure of which is hereby incorporated by reference. It will, of course, be appreciated that a wide variety of storage structures may be used with the present invention, a requirement being that they be accessible through a conveyor network. The carousel may have a plurality of tiers of container storage racks. The tiers communicate using a lift 56 with platforms. Between the lift and each tier of each carousel 50 are a container inserter and extractor assemblies 52 and 54, respectively. Such lifts, extractors and inserters are also described in above-mentioned U.S. Pat. No. 5,238,351, but others could be used as well.

On a first level which may be the lowest level, on the side of the lift opposite each stack of inserters 52, are incoming stub conveyors 88 (FIG. 3) of conveyor network 46 (FIG. 1). On a second level which may be immediately above the lowest level, on the side of the lift opposite each stack of extractors 54, are outgoing stub conveyors 90 (FIG. 3) of conveyor network 46 (FIG. 1). Conveyors 94 and 92 connect receiving area 22 with stubs 88 and 90, respectively. On a third level, which may be, for example, three levels above the lowest level, as shown in FIG. 3, are workstations 62, one for each carousel 50, and takeaway and supply conveyors 58 and 60, respectively, connecting each workstation to its respective carousel. The workstations are adjacent sections 34 of the sorter track 64, and are used to transfer goods from the storage containers 86 onto tilt tray assemblies 98 of the sorter. Sections 36 of the sorter are not at the same level as sections 34 because sections 36 cross conveyors 58 and 60. In the described embodiment, sections 36 are at a higher level, as shown in FIG. 3.

A wide variety of workstations may be used with the present invention. If the container-to-sorter transfer is done by a human operator 84, the workstation should include a display (not shown) for informing the operator which of the articles in the storage container must be transferred to the sorter. The operator would then verify that the requested article or articles are in fact in the storage container on table 63 in the workstation. One or two articles may be thrown on a given tilt tray, which must be empty to begin with. Accurate selection of a particular tilt tray assembly 98 to be loaded is unnecessary if a camera (not shown) is provided to identify which of the initially empty tilt trays that pass the workstation is no longer empty as it departs the workstation. The workstation preferably includes tilting table 63 and tiltable shelf 96. Table 63 holds storage containers 86 tilted towards an operator to facilitate removal of articles to be transferred from a storage container onto a tilt tray assembly of the sorter. The removed article can then be held on shelf 96 until an available tilt tray passes adjacent the workstation.

Consolidation area 26 may be traversed longitudinally by four sections 38 of sorter track 64. On either side of each section 38 may be two side-by-side rows of hoppers 102 and 104 (see FIG. 4) underneath each of which consolidation containers 100 (see FIG. 4) may be transported by an OCIS 74 as described in greater detail below. Consolidation containers 100 may be, for example, plastic totes that may measure 24"×24"×18". The empty consolidation containers arrive from shipping area 24 on a conveyor 66. The containers, as is well known in the art, may be pushed by a pusher 68 onto a conveyor stub 70 associated with an OCIS 74. There is one such stub for each OCIS 74. The transition from the continuous motion of conveyor 70 to the reciprocating motion of OCIS 74 is accomplished by a feed device 72 situated between them and described in greater detail below.

At the exit end of OCIS 74, loaded consolidation containers are pushed onto a conveyor stub 76 which acts as a buffer, holding the consolidation containers until a space is available on conveyor 78. Conveyor 78 may carry the loaded consolidation containers to a dispensing station indexing system 80, similar to OCISs 74, where items such as documents, price tickets, hangers, or flashers are dropped into the consolidation containers. The consolidation containers are then delivered by conveyor 82 to packing stations in shipping area 24 where the goods in each consolidation container are packed for shipment to the customer.

FIG. 4 is a cross-sectional view of consolidation area 26, illustrating the relative positions of the sorters, hoppers 102, 104, consolidation containers 100, and OCISs 74. On either side of each sorter track 64 are a near row of hoppers 104 and a far row of hoppers 102 relative to the sorter track. The four sections 38 of sorter track 64 are supported above warehouse floor 101 by frames 142 sufficiently high to allow goods to be transferred to the hoppers on inclined chutes 106.

Underneath each row of hoppers, an OCIS 74 carries consolidation containers 100. As shown in greater detail in FIG. 6, tilt tray assembly 98 of sorter 64 includes a tiltable tray 144 that can carry goods and drop them at a desired location by tilting to a side. An example of a sorter using such tilt trays is model TT-2000 available from Kosan Crisplant, USA Inc., Frederick, Md. The throughput of the sorter may be about 10,000 trays per hour.

A more detailed view of sorter tilt tray assembly 98 and its track 64 is given in FIGS. 8 and 9. The tilt tray assembly comprises a cart 148 with a code plate 150 exhibiting a code by which each tilt tray assembly may be identified. The tilt tray assemblies are identified as they move along track 64 over code readers 152. When a tilt tray assembly arrives at a location where the article it carries must be unloaded, tray 144 may be tilted by activation arms 146, one on each side of the tilt tray assembly. One arm or the other may be raised as it passes over shifting devices 154, thus tilting the tray to the other side.

FIGS. 5, 6 and 7 illustrate the details of the hoppers and the procedure for transferring goods from the tilt trays into the hoppers. In FIGS. 5 and 7, arrow A indicates the direction of motion of consolidation containers 100. When tiltable tray 144 of a sorter is tilted to a side as shown in FIG. 6, the article it carries slides onto a tiltable chute 106. Tiltable chute 106 has its upper edge fixed at a fixed pivot point near the sorter track by joint 103. A piston-cylinder arrangement 105 brings the lower edge of chute 106 near either fixed chute 124 leading to hopper 104 or fixed chute 122 leading to hopper 102. Chutes 122 and 124 are attached to hoppers 102 and 104, which are attached, in turn, to frame 142. Using tiltable tray 144 and tiltable chutes 106, one of four hoppers can be selected to receive the article carried by the sorter.

As shown in the plan view of FIG. 5, each hopper is bounded by two walls 126 perpendicular to the direction of track 64. Parallel to the direction of track 64, hoppers 104 are bounded by walls 128 and 130, and hoppers 102 by walls 132 and 134. Each pair of hoppers 102 and 104 has a shared pair of doors 114 with hinges 136, capable of closing the bottom of the hopper. Both doors are activated by a piston-cylinder arrangement 120 having an upper end attached to the underside of chute 122, and a lower end attached to a horizontal beam 118. Each end of beam 118 is attached to a beam 116 with a joint 138. Each beam 116 is attached at its other end to a hopper door 114 with joint 140. Raising the lower end of piston-cylinder arrangement 120 closes doors 114, and lowering it opens them.

Consolidation containers 100 may be positioned under the hoppers by OCIS 74. As shown in FIGS. 10–11, the main components of the OCIS are fixed frame 75, stops 110 attached to fixed frame 75, drive 112, and reciprocating frame 173. The OCIS may be hundreds of feet long and is described further with reference to FIGS. 10–19B. In FIGS. 10, 11 and 13–19B, the forward direction is referred to by arrow B. Fixed frame 75 stands on vertical supports 182 connected in pairs by transverse beams 180. Supports 182 hold rollers 170 and stationary frame members 172 on both sides of the system. Rollers 170 are bolted to vertical supports 182. Members 172 have a U-shaped cross-section, as shown in FIG. 12. Above and on the outside of members 172 are integral guard rails 168 which guide consolidation containers 100 and prevent them from moving to the sides. Pivotally connected inside member 172 by nut, bolt and spacer arrangements 186 are stops 110. As shown in FIG. 13, stops 110 may have a generally trapezoidal shape, and their pivot point may be positioned such that the stops have an equilibrium position wherein a side rests on the bottom of member 172 and one vertical and one inclined side 177 and 179, respectively, extend above member 172. The stops can recede inside member 172 by pivoting around nut, bolt and spacer arrangements 186. This action is provided by a passing container 100. The stops are spaced 31.5" apart.

Rollers 170 movably support reciprocating frame 173 relative to fixed frame 75. Such rollers may be provided, for example, every 8 feet. It will be appreciated that rollers may be attached to the reciprocating frame instead of the fixed frame, and roll on the fixed frame. Reciprocating frame 173 may comprise two longitudinal members 174 which rest on rollers 170 and support consolidation containers 100. Longitudinal members 174 may be connected by a plurality of transverse members 176, forming a plurality of rectangular structures. Extending diagonally between opposite corners of these diagonal structures are diagonal members 178.

The tops of members 174 may be covered with a material 184 which provides low frictional wear for the bottom of the consolidation containers. Suitable materials to perform this function are polyurethane, polypropylene, nylon or other polymeric materials.

As shown schematically in FIGS. 18A–19B, the feed ends 175 of reciprocating frame longitudinal beams 174 are tapered to prevent collisions with consolidation containers when beams 174 first slide under the containers while the containers are held by feed device 72 as described below. Beams 174 have stops 214 mounted at their discharge ends. Stops 214 are similar to stops 110 of the fixed frame, and operate in the same manner. As described below, stops 214 push consolidation containers off the OCIS and onto a takeaway conveyor 76.

FIG. 13 illustrates the operation of stops 110 (and stops 214). The stop is shown with full lines in its equilibrium position and in phantom in its recessed position. A consolidation container may be moved forward over the stop by the forward motion (arrow B) of the reciprocating frame, as the stop can pivot counterclockwise from its equilibrium position into the recessed position. Backward movement of a consolidation container over the stop is not possible because the bottom of U-shaped member 172 prevents the stop from pivoting clockwise from its equilibrium position. The stop therefore remains raised and holds the consolidation container even as the reciprocating frame slides backward under the consolidation container. If the amplitude of the forward motion of the reciprocating frame is greater than the largest spacing between any two consecutive stops, the consolidation containers will be positioned against new stops at the end of each backward motion of the reciprocating frame. Note that the stops need not be uniformly spaced as long as the above conditions are satisfied.

The reciprocating frame may be moved by drive assemblies 112. The number of drive assemblies depends on the size of the OCIS and on the power of their motors. An OCIS whose length is about 400 feet may require three drive assemblies, each having a motor of two horsepower. The drive assemblies may be located, for example, every 140 feet. As can best be seen from FIGS. 10, 12, 14 and 15, the drive assemblies each comprise a floor support 166 holding a motor 156 and a forward sprocket 160. Motor 156 drives rear sprocket 158. Sprockets 158 and 160 hold a chain 162. The chain may be attached by weldment link 164 to reciprocating frame 173 at the mid point of a transverse beam 176.

Connecting OCIS 74 to a supply conveyor 70, carrying empty consolidation containers 100 such as totes, for example, requires an intermediate feed device 72, as shown in FIGS. 16–17. This device propels the consolidation containers beyond the end of the supply conveyor and permits reciprocating frame 173 to slide under the consolidation containers while preventing the consolidation containers from moving backward. In this arrangement, two belts 210 propel the consolidation container onto the OCIS without interfering with the backward motion of reciprocating frame 173 underneath the consolidation container. The consolidation container is prevented from moving backward when the reciprocating frame moves under it by two stops 196, similar to stops 110, held by brackets 194 mounted onto a transverse beam 192 of feed device 72. Each of the two belts 210 may be held by a pulley 206 mounted on drive axle 208 and by a pulley 212 mounted on axle 211. Axle 208 is driven by motor 198 using belt 202, and pulleys 200 and 204. Axles 208 and 211 are mounted on side panels 190 of feed device 72. Sideways movement of the consolidation containers is prevented by guard rails 188 on either side of feed device 72 (not shown).

The principle of operation of the OCIS is described with reference to FIGS. 18A–19B. These figures schematically illustrate a full length of such a system, which, as noted, may be on the order of 400 feet, beginning with the end at feed conveyor 70 and ending with the beginning of take away conveyor 76. A typical stroke of the reciprocating frame for such a system, having, as noted, stops spaced 31.5" apart, may be about 35 inches.

Initially, a consolidation container may be transferred from feed conveyor 70 onto belts 210 of feed device 72, resulting in consolidation container position 216 in FIGS. 18A–18B. The consolidation container is next moved by belts 210 beyond stops 196, resulting in position 218 in FIGS. 19A–19B. Stops 196 hold the consolidation container while reciprocating frame longitudinal members 174 slide underneath the container, resulting in position 220 in FIGS. 18A–18B. When the members 174 move forward, the consolidation container is pushed past the first pair of stops 110 of the OCIS, in position 222 of FIGS. 19A–19B.

Thereafter, the consolidation container is held by stops 110 while members 174 move backward, and then pushed past an additional pair of stops 110 while members 174 move forward (arrow B). Containers are moved along the OCIS in this manner by the back and forth motion of reciprocating frame 174. Finally, in the configuration of position 230 in FIGS. 19A–19B, the consolidation container is in front of the last pair of stops 110. When the members 174 of reciprocating frame 173 move backwards, stops 214 on reciprocating frame 174 at the discharge end slide behind the consolidation container as shown by position 232 in FIGS. 18A–18B, after which they push the consolidation container onto conveyor 76 with the forward motion of members 174 of frame 173 (position 234 in FIGS. 19A–19B).

In a preferred method of operation, the OCISs are loaded with empty consolidation containers while the hoppers are filled with the ordered goods. The orders for goods may be assigned to the hoppers such that the consolidation containers are delivered to takeaway conveyor 78 in the order in which the orders are to be loaded onto trucks. This order is usually the reverse of the order of unloading from the truck during delivery. In a system with about 2400 hoppers, the loading of all the hoppers may take about one and a half hours, and most hoppers are not full until the last five minutes. This time is usually sufficient for the empty consolidation containers to be positioned under the hoppers. In order to position a consolidation container under each hopper, the consolidation containers must be introduced in sequence. All the consolidation containers reach their assigned final positions at the same time, when the last consolidation container is introduced at the feed end and the first container introduced arrives at the position closest to the exit end. Such a set of concurrently positioned consolidated containers may be referred to as a wave. For example, it may take about 30 minutes to position consolidation containers under 16 rows of about 150 hoppers each. As soon as all empty consolidation containers are positioned under the hoppers, their bottom doors 114 may be opened, even if the hoppers are not yet full. In principle, all hoppers could be opened at the same time but the means to power the doors, such as electrical power or compressed air, may limit the number of doors that can be activated at any one time.

As soon as the consolidation containers are full, the doors of the hoppers may be closed and the hoppers may begin to be filled with goods for the next wave of consolidation containers. At the same time, the full consolidation containers may be discharged to the take away conveyor. Any number of full consolidation containers may be discharged before new empty consolidation containers are sequentially introduced, and any number of remaining full consolidation containers may be discharged while the new empty consolidation containers are being introduced. The introduction of the new empty consolidation containers should start as soon as possible.

In summary, an apparatus and method for consolidation of warehoused goods into orders, sets or kits has been described. The apparatus of the present invention allows precise simultaneous positioning of a large number of objects without requiring precise drive motion, sensors, or long chains. Typical throughput attainable with this apparatus is positioning of totes under 16 rows of 150 hoppers each in 30 minutes. The method of the present invention allows concurrent filling of a large number of orders, each of which is filled with a large number of items concurrently, even if items for different orders are initially stored in the same storage container. Typical throughput attainable with this method is filling of about 2400 orders in about one and a half hours, or about 10,000 orders containing about 600,000 articles per day.

The present invention has been described in terms of a preferred embodiment. The invention, however, is not limited to the embodiment depicted and described. Rather, the scope of the invention is defined by the appended claims.

What is claimed is:

1. A storage and retrieval system, comprising:

a continuously rotatable storage structure for holding containers for articles;

a workstation wherein containers are received from the storage structure and wherein at least one of said articles from a container is transferred to a sorter;

said sorter extending between said workstation and a plurality of holders for distributing articles among said holders, said holders located above a sequence of positions for an article receiving means;

a stationary frame extending along said sequence of positions;

a rigid reciprocating member supported by said frame for supporting a plurality of said article receiving means, propelling said article receiving means while said reciprocating member is moving in a forward direction relative to said frame, and exerting a force on said article receiving means while said reciprocating member is moving in a backward direction relative to said frame;

a guide for confining said article receiving means to movement in said forward and backward directions;

a plurality of stops positioned along said frame such that said article receiving means abut thereto when said article receiving means are at one of said sequence of positions, said stops allowing forward movement of said article receiving means and preventing backward movement of said article receiving means when said article receiving means abut thereto; and a drive for moving said reciprocating member alternately in said forward and backward directions relative to said frame thereby advancing said article receiving means through said sequence of positions.

2. The storage and retrieval system of claim 1 wherein said storage structure includes tiers and further including a lift for moving containers between said tiers.

3. The storage and retrieval system of claim 1 wherein said workstation includes a tilt table.

4. A consolidation system, comprising:

a sorter supported by a frame and including a plurality of tiltable trays that can carry articles;

first and second rows of hoppers located on a first side of said sorter;

third and fourth rows of hoppers located on a second side of said sorter;

said first row of hoppers located nearer said sorter than said second row of hoppers, and said third row of hoppers located nearer said sorter than said fourth row of hoppers;

a first set of tiltable chutes supported by said frame on the first side of said sorter to receive articles from said tiltable trays and to direct articles into a selected one of said hoppers in said first or second row;

a second set of tiltable chutes supported by said frame on the second side of said sorter to receive articles from said tiltable trays and to direct articles into a selected one of said hoppers in said third or fourth row;

said hoppers in said first, second, third, and fourth rows located above a sequence of positions for containers for receiving articles from said hoppers;

a reciprocating member for supporting a plurality of said containers, propelling said containers while said reciprocating member is moving in a forward direction relative to said frame, and exerting a force on said containers while said reciprocating member is moving in a backward direction relative to said frame;

a plurality of stops that allow forward movement of said containers and prevent backward movement of said containers when said containers abut thereto, thereby defining said sequence of positions for said containers relative to said hoppers; and a drive for moving said reciprocating member alternately in said forward and backward directions thereby advancing said containers through said sequence of positions wherein articles can be transferred from said hoppers to said containers at said sequence of positions.

5. The system of claim 4 wherein said hoppers include doors at a bottom opening thereof for retaining articles therein when the doors are closed and for transferring articles to the containers at said sequence of positions when the doors are open.

6. The system of claim 5 wherein said first and second sets of tiltable chutes are pivotally secured to said frame to move between a first fixed chute for transferring articles to a hopper located nearer said sorter and a second fixed chute for transferring articles to a hopper located farther away from said sorter.

7. An apparatus, comprising:

a stationary frame;

a rigid reciprocating member supported by said frame for supporting a plurality of objects, carrying said objects in a forward direction relative to said frame when said reciprocating member is moving in said forward direction, and carrying said objects in a backward direction relative to said frame when said reciprocating member is moving in said backward direction, said reciprocating member being supported on said frame by a plurality of rollers and said reciprocating member including a tapered feed end for facilitating insertion of said objects thereon;

a plurality of stops positioned along said frame that allow forward movement of said objects and prevent backward movement of said objects when said objects abut thereto when moving in said backward direction, thereby defining a sequence of positions for said objects relative to said frame;

a guide for confining said objects to movement in said forward and backward directions; and a drive for moving said reciprocating member alternately in said forward and backward directions relative to said frame thereby advancing said objects through said sequence of positions.

* * * * *